US007433043B2

(12) United States Patent
Birge et al.

(10) Patent No.: US 7,433,043 B2
(45) Date of Patent: Oct. 7, 2008

(54) TWO-DIMENSIONAL SPECTRAL SHEARING INTERFEROMETRY FOR ULTRAFAST PULSE CHARACTERIZATION

(75) Inventors: Jonathan R. Birge, Cambridge, MA (US); Richard Ell, Belmont, MA (US); Franz X. Kaertner, Newton, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 40 days.

(21) Appl. No.: 11/608,683

(22) Filed: Dec. 8, 2006

(65) Prior Publication Data
US 2007/0171422 A1    Jul. 26, 2007

Related U.S. Application Data

(60) Provisional application No. 60/748,860, filed on Dec. 9, 2005.

(51) Int. Cl.
*G01B 9/02* (2006.01)
(52) U.S. Cl. ...................... 356/450; 356/520
(58) Field of Classification Search ........... 356/450, 356/491, 520
See application file for complete search history.

(56) References Cited

U.S. PATENT DOCUMENTS

| | | | | |
|---|---|---|---|---|
| 5,107,351 A | * | 4/1992 | Leib et al. ............... | 359/11 |
| 5,359,410 A | * | 10/1994 | Diels et al. .............. | 356/450 |
| 5,530,544 A | | 6/1996 | Trebino et al. | |
| 5,553,093 A | * | 9/1996 | Ramaswamy et al. ...... | 372/100 |
| 6,456,380 B1 | | 9/2002 | Naganuma ............... | 356/450 |
| 6,633,386 B2 | | 10/2003 | Walmsley et al. ......... | 356/450 |
| 6,683,691 B2 | | 1/2004 | Grunwald et al. ......... | 356/450 |
| 7,006,230 B2 | | 2/2006 | Dorrer et al. ............. | 356/451 |
| 2003/0025911 A1 | | 2/2003 | Walmsley et al. | |

FOREIGN PATENT DOCUMENTS

WO    PCT/US98/15355    *    7/1998    ............. 356/450

OTHER PUBLICATIONS

Birge et al., "Two-dimensional spectral shearing interferometry for few-cycle pulse characterization", *Optics Lett.*, 31(13):2063-2065 (2006).
International Search Report and Written Opinion for PCT/US2006/047047 (Nov. 9, 2007), 11.

* cited by examiner

*Primary Examiner*—Tarifur R Chowdhury
*Assistant Examiner*—Michael Lapage
(74) *Attorney, Agent, or Firm*—Modern Times Legal; Robert J. Sayre

(57) ABSTRACT

The phase spectrum of an ultrashort pulse is measured based on two-dimensional spectral shearing interferometry with zero delay. The measurement is performed utilizing an optical source pulse from which is extracted a short pulse and from which a chirped component is generated. The chirped component is split into first and second chirped pulses. The first and second pulses are then mixed with the short pulse in a nonlinear medium to produce up-converted and spectrally sheared copies of the first and second chirped pulses, which are measured in a spectrometer. A plurality of path lengths for the first second chirped pulses is provided to shift the relative phases of the first and second chirped pulses for additional measurements. The apparatus and methods are uniquely suited for characterizing single-cycle pulses.

23 Claims, 3 Drawing Sheets

TWO-DIMENSIONAL SPECTRAL SHEARING INTERFEROMETRY FOR ULTRAFAST PULSE CHARACTERIZATION

RELATED APPLICATION

This application claims the benefit of U.S. Provisional Application No. 60/748,860, filed Dec. 9, 2005, the entire teachings of which are incorporated herein by reference.

GOVERNMENT SUPPORT

This invention was made with government support awarded by the Office of Naval Research under Grant No. N00014-02-1-0717 and by the Air Force Office of Scientific Research under Grant No. FA9550- 04-1-0011. The United States Government has certain rights in the invention.

BACKGROUND

As few- and single-cycle optical pulses have become more common, spectral phase interferometry for direct electric-field reconstruction (SPIDER) has emerged as a preferred method for determining the phase of such pulses. The SPIDER technique is discussed, for example in U.S. Pat. Nos. 6,683,691; 6,456,380; 6,633,386; and 7,006,230. However, there are several issues with SPIDER that are particularly cogent when dealing with such large bandwidths.

First, the delay, τ, between the pulse copies must be calibrated and maintained to within superinterferometric precision: in any spectral interferometry, the pulse width error, δt, for a given delay error, δτ, is approximately $$\delta t \approx \delta \tau \left( \frac{\Delta \omega}{\Omega} \right) \quad (1)$$

where $\Delta\omega$ is the pulse bandwidth and $\Omega$ is the shear. For a single-cycle pulse, the term within parenthesis is typically between 10 and 100; and, thus, the delay, τ, must be known to within 3 to 30 attoseconds to achieve 10% accuracy in the measured pulse width. Such accuracy is difficult for delays on the order of picoseconds as it requires frequency determination on the order of one part in 100,000.

The above also implies that the optical delay must be stable to within 1 to 10 nanometers from calibration to measurement, which is difficult to achieve given inevitable changes in beam alignment during calibration or subsequent optimization. It takes very little angular error to generate 10 attoseconds of timing shift in an interferometer set to one picosecond of delay; starting with perfect alignment, this shift will happen with only about 6 milliradians of angle, which can easily occur during optimization of a laser. Unfortunately, there is no self-consistency check available in SPIDER, so any error in τ simply manifests as an additive quadratic phase, potentially resulting in underestimation of the pulse width. In cases where SPIDER is used to iteratively optimize a laser, it is possible that small beam-pointing changes during optimization or thermal shifts in the setup will lead to perturbation of τ, yielding a false optimization, unless care is taken to recalibrate after every change.

Another difficulty with standard spectral interferometry is that all phase information is encoded in a single spectrum. With a grating spectrometer, there is always a tradeoff between bandwidth and resolution, and this translates to a limitation on measurable pulse bandwidth for a given delay. Since the shear and delay are linked by the dispersion of the chirped pulse, it is not always possible to choose the optimal value of either in SPIDER.

Lastly, any pulse measurement method that passes the measured pulse through an interferometer necessarily perturbs the pulse due to non-idealities in the beamsplitter and transmission through the splitter substrate. It is exceptionally difficult to design a beamsplitter that operates well over an octave of bandwidth.

The latter two issues are avoided in the recently developed zero-additional-phase (ZAP)-SPIDER method, which uses two chirped pulses up-converting one short pulse. However, the ZAP scheme involves a complex non-collinear geometry that reduces up-conversion efficiency and complicates the production of the pulse delay. Furthermore, it introduces first-order coupling between the frequency and the angle of the two up-converted beams that further complicates calibration. For these reasons, perhaps, it has not yet been successfully demonstrated on pulses less than 10 femtoseconds (fs), nor without separate amplification of the chirped pulses.

Another variant of SPIDER, spatially encoded arrangement (SEA) SPIDER, uses two chirped pulses to upconvert a single short pulse, similar in this regard to methods described herein. However, SEA-SPIDER tilts the two chirped pulses relative to each other, producing a fringe in space that must be resolved with an imaging spectrometer. While this has the advantage of allowing for single shot measurement, it also results in coupling between the spatial structure of the pulse and the temporal envelope, complicating the reconstruction. Moreover, the noncollinear nature of the output necessarily introduces a delay between the pulses, requiring the sensitive calibration of interpulse delay typical of regular SPIDER.

SUMMARY

The apparatus and methods disclosed herein offer means for characterizing an optical pulse in terms of its amplitude and phase as a function of time. The characterization is performed utilizing a two-dimensional spectral shearing interferometry (2DSI) technique, wherein three distinct pulses (i.e., a short pulse, a first chirped pulse, and a second chirped pulse) are generated from a single optical source pulse, e.g., from a laser. The short pulse can be extracted as a reflection off of an optically dispersive medium (e.g., SF10 glass) provided in the path of the source pulse. The component of the source pulse that passes through the optically dispersive medium is chirped; and that chirped component is then split into distinct first and second chirped pulses via a beamsplitter. The first and second chirped pulses can be displaced relative to one another by providing a plurality of path lengths for the first chirped pulse (e.g., in a Michelson interferometer). In one embodiment, the delays are generated by using a stepped mirror; in an alternative embodiment, the delays are generated by moving the mirror. The first and second chirped pulses are then directed collinearly to a nonlinear medium where the chirped pulses are mixed with the short pulse to produce up-converted and spectrally sheared copies of the first and second pulses. Those up-converted pulse are measured in a spectrometer as the relative positions of the waveforms of the first and second chirped pulses are shifted relative to one another.

The 2DSI technique described, herein, is relatively simple optically, with little calibration required; and yet it is capable of extremely accurate measurements over a large bandwidth. Rather than encode phase as a sensitively calibrated fringe in the spectral domain, methods described herein robustly encode phase along a separate dimension, greatly reducing demands on the spectrometer and allowing for complex phase spectra to be measured over extremely large bandwidths. The relaxation on spectrometer resolution, the lack of dispersion on the pulse to be measured, and the absence of delay between the sheared pulses make two-dimensional spectral shearing interferometry extremely well suited for the measurement of wide-bandwidth pulses, including those with potentially complicated phase spectra.

Figure 1:
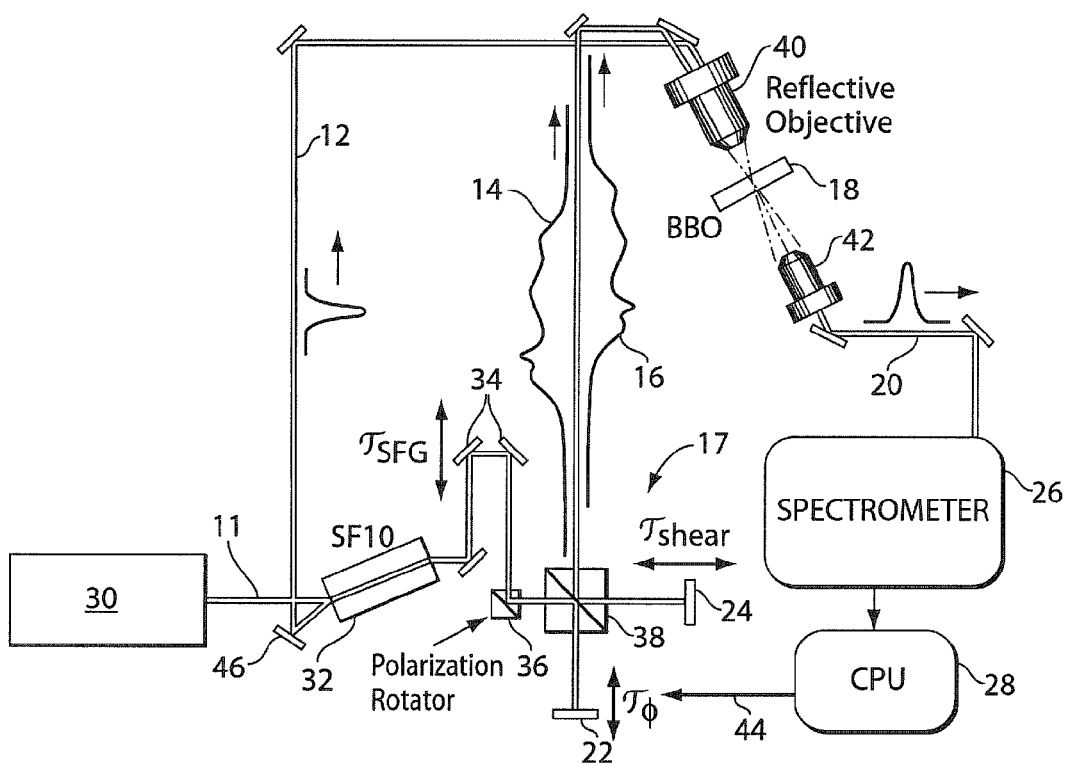
FIG. 1 is a schematic illustration of a two-dimensional spectral shearing interferometry (2DSI) apparatus.

The foregoing and other features and advantages of the invention will be apparent from the following, more-particular description. In the accompanying drawings, like reference characters refer to the same or similar parts throughout the different views. The drawings are not necessarily to scale, emphasis instead being placed upon illustrating particular principles, discussed below.

DETAILED DESCRIPTION

In the technique of this disclosure, one short pulse 12 and two collinear and chirped pulses 14 and 16 are generated from a single source pulse 11, as shown in FIG. 1. The short pulse 12 is then up-converted with the two collinear and chirped pulses 14 and 16. The original source pulse 11 is generated by a laser 30 and directed to SF10 glass (a high-dispersion dense flint glass) 32, angled so that a first portion of the pulse (e.g., about 4% of the pulse) is externally reflected without distortion at an angle down to mirror 46 as the short pulse 12. The SF10 glass 32 produces a chirped component 48 of the source pulse 11. The chirped component 48 is later split into the two chirped pulses 14 and 16 in a Michelson interferometer 17. Chirping of the source pulse extends the length of the pulse by, for example, a factor of 100 or 1,000. After the chirped component 48 is chirped in the SF10 glass 32, the chirped component 48 is redirected via displaceable mirrors 34 to a polarization rotator 36 that rotates the polarization of the pulse component 48 by 90°; alternatively, the polarization rotator 36 can be positioned further donwnstream (e.g., in the path for the first and second chirped pulses 14 and 16) between the beamsplitter 38 and the reflective objective 40.

The chirped component 48 is split into the first and second chirped pulses 14 and 16 in a beamsplitter 38. In one embodiment, the beamsplitter 38 is in the form of a cube formed of two triangular glass prisms that are glued together with a resin layer having a thickness adjusted as a function of pulse wavelength such that about half of the chirped component 48 transmitted through one face of the cube is transmitted and the rest of the chirped component 48 is orthogonally reflected. In another embodiment, the beamsplitter 38 is a semi-transparent mirror including a thin coating of aluminum on a plate of glass, where the thickness of the aluminum is likewise set, as a function of pulse wavelength, to transmit about half of the chirped component 48 and to reflect the rest.

The first chirped pulse 14 is the portion of the chirped component 48 that is reflected by the beamsplitter 38 along a first path to a first displaceable mirror 22 in the interferometer 17. Meanwhile, the second chirped pulse 16 passes through the beamsplitter 38 along a second path to a second displaceable mirror 24 in the interferometer 17. Each of the displaceable mirrors 22/24 is mounted for axial displacement along the respective axis traveled by the respective chirped pulse 14/16. A displacement mechanism (e.g, a piezoelectric actuator) also is coupled with the displaceable mirror 22 to respectively lengthen or shorten the roundtrip passage for the chirped pulse 14 by a very small amount between the beamsplitter 38 and the mirror 22/24 (to achieve the phase scan). Accordingly, for example, as the mirror 22 is displaced further away from the beamsplitter 38 (e.g., by about 1 to 10 microns), the delay in the first chirped pulse 14 relative to the second chirped pulse 16 is extended. I.e., the waveform shown for chirped pulse 14 shifts back in relation to the waveform shown for chirped pulse 16 (above the beamsplitter 38). The other mirror 24 is controlled over a much larger distance by hand as part of the setup. The large delay between the paths to and from the two mirrors 22 and 24 controls the frequency shear. Additional displaceable mirrors 34 can likewise be displaced to change the path length for the unitary chirped component 48 before the split to jointly shift the delay of both chirped pulses 14 and 16. More specifically, displacement of the mirrors 34 adjusts the absolute upconversion frequency by controlling where the short pulse overlaps with the chirped pulses.

The two chirped pulses 14 and 16 that are produced in the interferometer 17 (after exiting upward from the beamsplitter 38, as illustrated) are then focused along with the short pulse 12 via a focusing element in the form of reflective objectives 40 and 42 and mixed in a Type-II second-order nonlinear ($\chi^{(2)}$) crystal 18 (e.g., in the form of barium borate). The two up-converted copies that result in path 20 are sheared spectrally, but are collinear and have no delay between them (they essentially form a single pulse with a complicated spectrum). The delay of the chirped pulse 14 is scanned over a few optical cycles by vibrating its mirror 22 in the interferometer 17 (e.g., by dithering the position of the mirror over a displacement range of about 5 microns along the axis along which the respective chirped pulse travels). This is tantamount to scanning the zeroth-order phase of one of the pulse copies. Finally, the spectrum of the output pulse is recorded in a spectrometer 26 (e.g., a charge-coupled device)as a function of this phase. The raw two-dimensional intensity spectra are theoretically given by $$I(\omega, \tau_\phi) = 2A(\omega)A(\omega - \Omega)\cos\left[\omega_{CW}\tau_\phi + \frac{\phi(\omega) - \phi(\omega - \Omega)}{\tau_\phi(\omega)\Omega + C(\Omega^3)}\right] + D.C. \quad (2)$$

where $\tau_\phi$ and $\omega_{CW}$ are the delay and frequency, respectively, of the quasi-continuous-wave (quasi-CW) signal being shifted, $A(\omega)$ is the up-converted pulse spectrum, and $\phi(\omega)$ is the phase spectrum of the pulse. The bracketed term is the first-order finite difference of the group delay spectrum multiplied by the shear frequency.

The calculations are performed in a central processing unit 28 (e.g., a computer including a processor coupled with memory loaded with software to carry out the calculations and to produce the output described, herein). The central processing unit 28 also is programmed to toggle the displacement mechanisms for the mirrors 22, 24 and 34, as described herein, via a communication signal 44.

A simple two-dimensional raster plot of the raw spectra (see FIG. 2, for example) measured by the spectrometer 28 reveals the pulse spectrum (up-converted) along the $\omega$-axis, with fringes along the $\tau_\phi$-axis that are shifted by an amount proportional to the group delay at the corresponding wavelength. The user can thus immediately ascertain the salient properties of the complex spectrum simply by looking at the raw output of the measurement; each spectral component is vertically shifted in proportion to its actual shift in time. This representation provides useful and immediate feedback when optimizing a laser, as both magnitude (with magnitude peaks highlighted as 50 and 52) and group delay spectra are displayed in the same plot.

Precise quantitative determination of the group delay spectrum can be directly obtained from the output of the spectrometer 28 by simply taking fast Fourier transforms along the phase axis, with no iterative processing or filtering required. The only calibration performed is that needed to determine the shear, $\Omega$. Since no delay is introduced between the two up-converted pulses, this calibration can be performed very accurately by measuring the pulse under a known dispersive element. Furthermore, multiple shears can be used on a given pulse as a self-consistent verification that no spurious absolute phase errors have occurred.

The ability to arbitrarily set the shear allows for optimal selection of shear to maximize the signal to noise for a given problem. Since there is no delay between the two converted pulses, the system may be used to measure a wide variety of pulse bandwidths and chirps, constrained only by noise limitations. The lack of processing on the measured pulse prior to up-conversion greatly simplifies the experimental setup by eliminating any concern over dispersion in the optics.

A significant advantage of two-dimensional spectral shearing interferometry (2DSI) is that it can be carried out with no delay or angle between the two up-converted pulses (neglecting the difference in photon momentum of the two quasi-continuous-wave beams). This absence of a delay makes for a very stable measurement, as it is difficult to introduce any delay between the two beams en route to the spectrometer. The lack of delay also obviates the most difficult part of the calibration for a SPIDER setup.

Figure 2A:
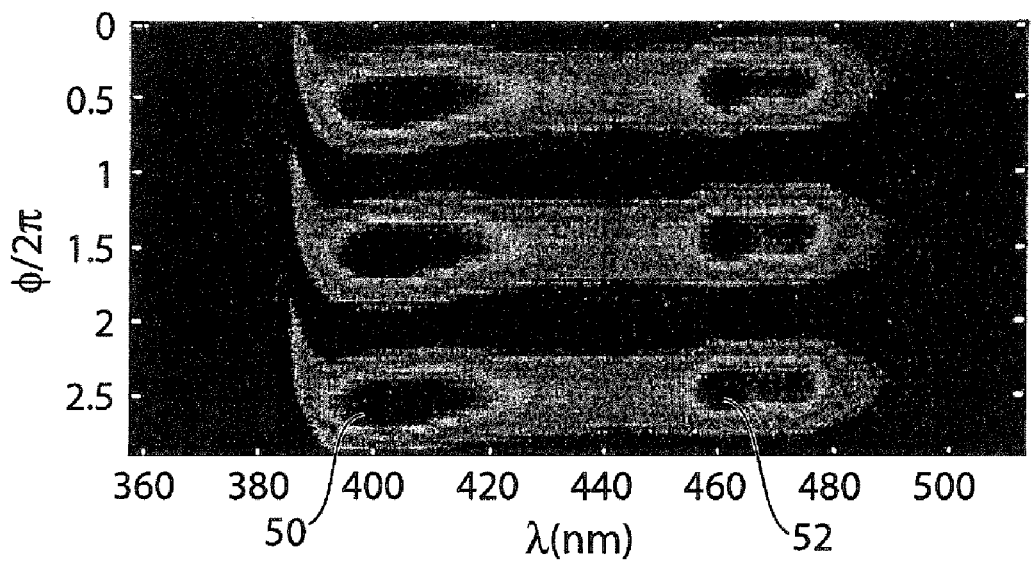
FIG. 2 is a raster plot output of two-dimensional spectral shearing for (a) few-cycle pulse, and (b) the same pulse after being dispersed by a fused-silica plate.
Figure 2B:
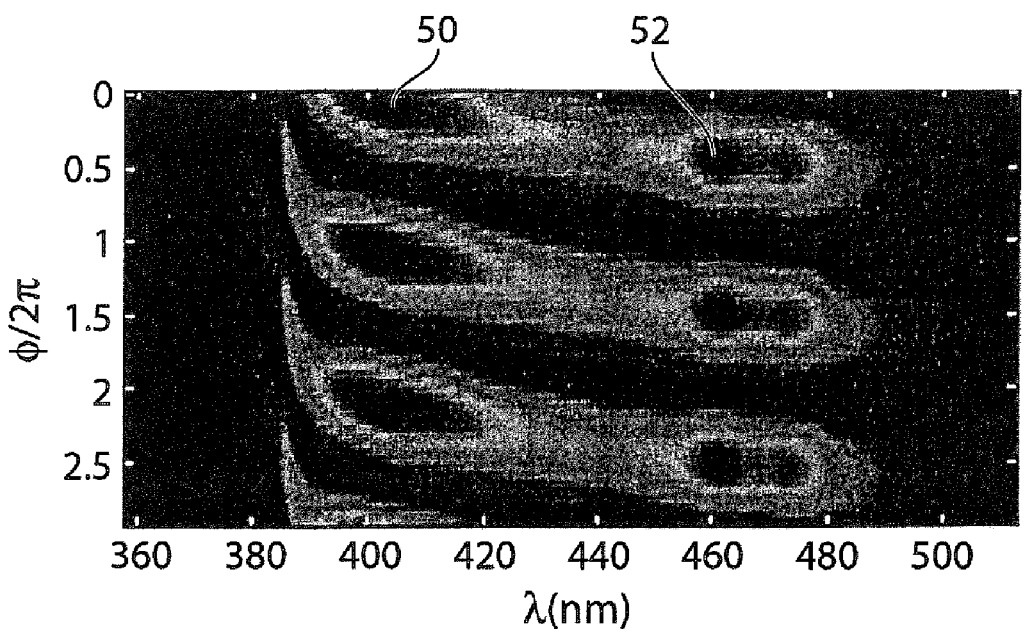
Figure 3:
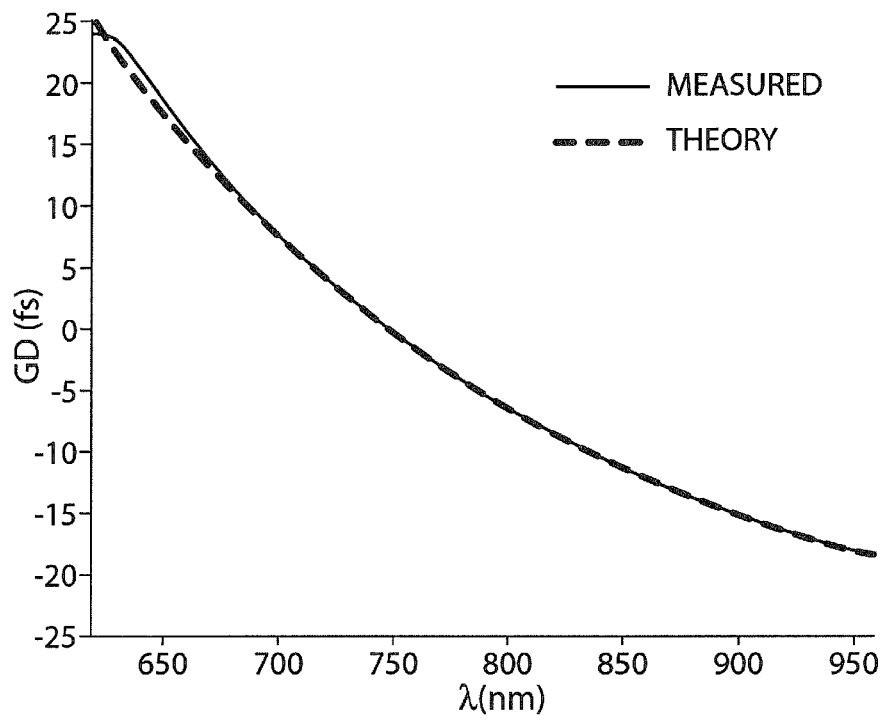
FIG. 3 is a chart showing the group delay measurement as a function of wavelength for a pulse passed through 1 millimeter of fused silica.

It is not necessary to know the distance and rate of the scan, as long as the scan is relatively linear over the measurement, as only the relative phase of the fringes matters in Equation (2). This greatly simplifies the implementation and analysis of 2DSI signals. To determine the relative accuracy of the method, a few-cycle pulse from a prismless Ti:Sa laser was measured. A 1-mm-thick fused silica plate was then introduced into the path of the pulse, and the dispersed pulse was measured. The raw output of the scans is shown in FIG. 2. The resulting group delay (obtained by directly subtracting the computed group delays from the two measurements without any fitting and shown as the shaded line) matches the theoretical value well (represented by the dotted line), as shown in FIG. 3.

Figure 4:
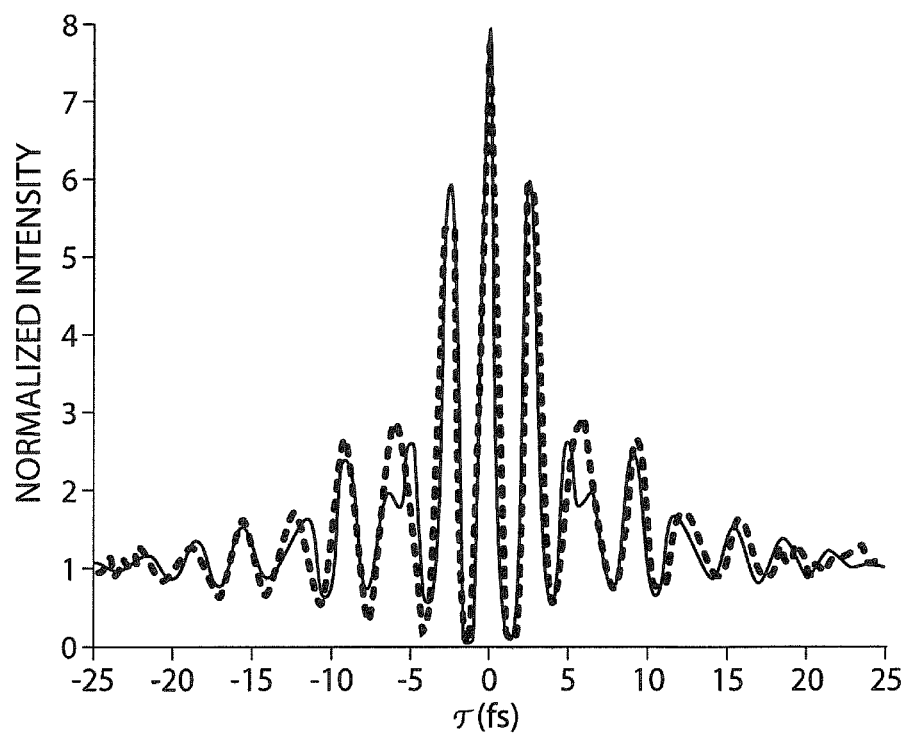
FIG. 4 is a chart showing the measured interferometric autocorrelation and the two-dimensional-spectral-shearing-predicted interferometric autocorrelation for a 5-femtosecond pulse.

To demonstrate the absolute accuracy of the system, an interferometric autocorrelation (IAC) was also performed on the same pulse and compared to that predicted by the phase obtained from the two-dimensional spectral shearing interferometry (2DSI) measurement. The predicted IAC trace (represented with the plotted line) and the experimental IAC trace (represented with the plotted dots) are shown in FIG. 4. The traces conform reasonably well, though with some errors that we largely attribute to limitations in the IAC technique for few-cycle pulses (note that the IAC is not symmetric, as it ideally should be). As a measure of the precision and repeatability of 2DSI, the same pulse width prediction was obtained to within a few hundredths of a femtosecond for shears ranging from 4 THz to 20 THz.

In addition to the prototypical embodiment described above, one can also measure a two-dimensional intensity function akin to that in equation (2) by replacing one of the mirrors 22/24 with a special mirror that is composed of a series of small steps along one axis (with the steps being sufficiently narrow to allow the incoming pulse stream to simultaneously reflect off of multiple steps at slightly different distances from the beamsplitter 38). Use of these steps takes the place of the temporal scanning employed in the previous embodiment, putting a set of increasing phase shifts along one spatial axis of one of the chirped pulses. We also replace the grating spectrometer 26 with a two-dimensional (2D) charge-coupling device (CCD) imaging spectrometer such that one axis is spectrally resolved and the other axis is imaged, ensuring that the phase steps are oriented perpendicular to the spectrally resolved axis. In this case, the resulting image on the 2D CCD will essentially be the intensity function given in (2), modulated with any spatial phase that might exist. This will allow for single-shot measurements, as well as a limited amount of spatial characterization. Furthermore, unlike SEA SPIDER this embodiment still maintains collinearity between the output pulses, avoiding the need for a sensitive delay calibration. However, the reconstruction is complicated by the coupling between space and time introduced by the stepped mirror, as with SEA SPIDER. A method for recovering the pulse profile from a spatio-temporal fringe is provided in the SEA SPIDER literature [for example, in E. Kosik et al., "Interferometric Technique for Measuring Broadband Ultrashort Pulses at the Sampling Limit," 30(3) OPTICS LETTERS 326-28 (Feb. 1, 2005)].

In describing embodiments of the invention, specific terminology is used for the sake of clarity. For purposes of description, each specific term is intended to at least include all technical and functional equivalents that operate in a similar manner to accomplish a similar purpose. Additionally, in some instances where a particular embodiment of the invention includes a plurality of system elements or method steps, those elements or steps may be replaced with a single element or step; likewise, a single element or step may be replaced with a plurality of elements or steps that serve the same purpose. Moreover, while this invention has been shown and described with references to particular embodiments thereof, those skilled in the art will understand that various substitutions and alterations in form and details may be made therein without departing from the scope of the invention; further still, other aspects, functions and advantages are also within the scope of the invention. The contents of all references, including issued patents and published patent applications, cited throughout this application are hereby incorporated by reference in their entirety. The appropriate components and methods of those references may be selected for the invention and embodiments thereof. Still further, the components and methods identified in the Background section are integral to this disclosure and can be used in conjunction with or substituted for components and methods described elsewhere in the disclosure within the scope of the invention.

What is claimed is:

1. A method for pulse characterization, comprising:
generating an optical source pulse;
extracting a short pulse from the optical source pulse;
producing a chirped component from the optical source pulse;

splitting the chirped component into a first chirped pulse and a second chirped pulse;

generating a phase shift for the first chirped pulse relative to the second chirped pulse;

directing the phase-shifted first and second chirped pulses and the short pulse through a nonlinear medium to produce a single output pulse having a spectrum comprising up-converted and spectrally sheared copies of the short pulse, wherein the first and second chirped pulses are collinear and overlapping as they pass through the nonlinear medium;

measuring the spectrum of the output pulse; and repeating the above steps with a plurality of different phase shifts for the first chirped pulse relative to the second chirped pulse.

2. The method of claim 1, further comprising rotating the polarization of the first and second chirped pulses relative to the polarization of the short pulse before the pulses pass through the nonlinear medium.

3. The method of claim 1, wherein the nonlinear medium comprises barium borate.

4. The method of claim 1, wherein the chirped component is generated from the source pulse by passing the source pulse through an optically dispersive medium, with the source pulse entering a front face of the optically dispersive medium.

5. The method of claim 4, wherein the short pulse is extracted from the source pulse as a portion of the source pulse reflected off the front face of the optically dispersive medium.

6. The method of claim 4, wherein the source pulse is extended in length by a factor of about 100 to about 1,000 as it passes through the optically dispersive medium.

7. The method of claim 1, wherein the first and second chirped pulses are split from the chirped component by a beamsplitter that directs each of the first and second chirped pulses along a distinct path between the beamsplitter and a mirror.

8. The method of claim 7, wherein the path length of the first chirped pulse is shifted by displacing the mirror in the path of the first chirped pulse.

9. The method of claim 7, wherein the first and second chirped pulses are collinear as they travel from the beamsplitter to the nonlinear medium.

10. The method of claim 1, wherein the chirped component is split in a Michelson interferometer.

11. The method of claim 1, wherein the spectrums of the output pulses for at least four different phase shifts are measured.

12. An apparatus for pulse characterization comprising:

an optically dispersive medium having a front face and being positioned to contact a source pulse emitted by a laser at its front face and to chirp a component of the source pulse that passes through the optically dispersive medium and to reflect a short pulse as a component of the source pulse off the front face;

a beamsplitter in the path of the chirped component of the source pulse, wherein the beamsplitter is configured to direct a first chirped pulse formed by reflection of a portion of the chirped component by the beamsplitter along a first path and to direct a second chirped pulse formed by transmission of another portion of the chirped component through the beamsplitter along a second path;

a first mirror in the first path, positioned and oriented to direct the first chirped pulse back to the beamsplitter;

a second mirror in the second path, positioned and oriented to direct the second chirped pulse back to the beamsplitter;

a nonlinear medium for mixing the first and second chirped pulses with the short pulse to produce an output pulse having a spectrum comprising up-converted and spectrally sheared copies of the short pulse, wherein the nonlinear medium, optically dispersive medium, mirrors and beamsplitter are positioned for the nonlinear medium to receive the chirped pulses from the beamsplitter, with the chirped pulses collinear and overlapping, and to receive the short pulse from the optically dispersive medium; and a spectrometer positioned to receive the output pulse from the nonlinear medium.

13. The apparatus of claim 12, wherein the optically dispersive medium has a composition that will extend the duration of a source pulse from the laser by a factor of about 100 to about 1,000.

14. The apparatus of claim 12, wherein the optically dispersive medium is SF10 glass.

15. The apparatus of claim 12, wherein the nonlinear medium is barium borate.

16. The apparatus of claim 12, further comprising a focusing optical element designed and positioned to focus the first and second chirped pulses and the short pulse into the nonlinear medium.

17. The apparatus of claim 16, further comprising additional optical elements positioned and oriented to direct the short pulse along one path from the front face of the optically dispersive medium to the focusing optical element and to direct the first and second chirped pulses collinearly along another path, distinct from the path for the short pulse, from the beamsplitter to the focusing optical element.

18. The apparatus of claim 12, farther comprising a polarization-rotating element positioned in the path of the chirped component of source pulse or in the path of the first and second chirped pulses.

19. The apparatus of claim 12, further comprising a displacement mechanism coupled with the first mirror.

20. The apparatus of claim 19, wherein the displacement mechanism is a piezoelectric controller.

21. The apparatus of claim 19, farther comprising a central processing unit configured for communication with the spectrometer and with the displacement mechanism for the first mirror.

22. The apparatus of claim 12, wherein the central processing unit comprises a processor and computer-readable memory on which is stored software code for processing measurements from the spectrometer and for characterizing the source pulse therefrom and for controlling the displacement mechanisms.

23. The apparatus of claim 12, farther comprising additional optical elements in the path of the chirped component of the source pulse that are displaceable to lengthen or shorten the path for the chirped component of the source pulse between the optically dispersive medium and the beamsplitter.

* * * * *